(12) United States Patent
Gola

(10) Patent No.: US 6,228,272 B1
(45) Date of Patent: May 8, 2001

(54) METHOD AND DEVICE FOR DISINFECTING POOL WATER IN A BRANCHED CIRCUIT THEREOF

(76) Inventor: André Gola, 2, rue Le Nôtre, 37170 Chambray-les-Tours (FR)

(*) Notice: Subject to any disclaimer, the term of this patent is extended or adjusted under 35 U.S.C. 154(b) by 0 days.

(21) Appl. No.: 09/380,834

(22) PCT Filed: Mar. 10, 1998

(86) PCT No.: PCT/FR98/00481

§ 371 Date: Dec. 13, 1999

§ 102(e) Date: Dec. 13, 1999

(87) PCT Pub. No.: WO98/40585

PCT Pub. Date: Sep. 17, 1998

(30) Foreign Application Priority Data

Mar. 10, 1997 (FR) .................................. 97 02905

(51) Int. Cl.[7] .............................. C02F 1/461; F04B 49/00
(52) U.S. Cl. .................... 210/742; 210/765; 210/754; 210/85; 210/169; 210/416.2; 210/149; 210/138; 422/37; 137/268; 417/32; 417/12
(58) Field of Search ................................ 210/742, 754, 210/765, 85, 169, 416.2, 149, 205, 206, 776, 805, 138, 243; 422/37, 264; 137/268; 417/12, 32

(56) References Cited

U.S. PATENT DOCUMENTS

| | | | |
|---|---|---|---|
| 2,739,939 | 3/1956 | Leslie | 210/11 |
| 3,554,212 | * 1/1971 | Maroney . | |
| 4,135,549 | * 1/1979 | Baker . | |
| 4,505,643 | * 3/1985 | Millis et al. . | |
| 5,326,481 | * 7/1994 | Alwerud . | |
| 5,993,669 | * 11/1999 | Fulmer . | |

FOREIGN PATENT DOCUMENTS

| | | |
|---|---|---|
| 2 491 530 | 4/1982 | (FR) . |
| 2 682 673 | 4/1993 | (FR) . |
| 2 714 044 | 6/1995 | (FR) . |

* cited by examiner

Primary Examiner—Joseph W. Drodge
Assistant Examiner—Terry K. Cecil
(74) Attorney, Agent, or Firm—Millen, White, Zelano & Branigan, P.C.

(57) ABSTRACT

Described is a method and device for servicing the water of a swimming pool 1 by adding a disinfectant. The disinfectant is added by circulating the water through a branched circuit of the pool using a constant flow stirring pump 5. The operation of the pump is determined by the temperature of the water detected by temperature sensor 30 located within the branched circuit. The operating time of the pump is determined according to preset programs of a control box 3 which divide the operating time into time slot units of similar duration spread over several time ranges. The disinfectant addition can be carried out by pebble support 64 or by electrolysis within the branch circuit. Also, if the temperature drops below a minimal freeze risk value or above a maximal value, the pump is continuously operated and a warning is generated.

11 Claims, 1 Drawing Sheet

METHOD AND DEVICE FOR DISINFECTING POOL WATER IN A BRANCHED CIRCUIT THEREOF

BACKGROUND OF THE INVENTION

The present invention is related to a method and a device for servicing the water of a swimming pool. It essentially aims at automatizing the operations, which are needed for maintaining the swimming pool water in sanitary conditions, appropriate for its use.

By considering first the case of the preferred application of the invention for individual swimming-pools, which is the application for swimming-pools which people frequently install in their gardens for swimming, it first must be observed that a feature of such pools is that the water that they contain must regularly be disinfected in order to prevent a proliferation of the bacterial flora which develops therein. It should be added that the large water quantity, the implantation conditions and the economic requirements conjugate to forbid resorting to a permanent water renewal, so that the servicing of the sanitary cleanliness in practice is performed by sucking water in the swimming-pool to let it pass through an external purifying circuit, generally by filtration and addition of a disinfectant, before injecting back the thus purified water into the same pool.

There follows that the invention is not limited to a particular pool type and that its applications extend to many other fields wherein the same needs are felt.

Examples of the other pools for which an equipment according to invention is valuable are pools used in hydropathic centers, or for animal bathing or fish farming, or for growing fragile plants. Those pools, which the invention encompasses in the term of pool, can be very different in their shapes, their depths, and their capacities. Similarly, when a disinfectant addition is mentioned within the scope of the invention, this notion must be understood as covering the case of any constituent which should be added to the pool water to regenerate it to the desired content, for instance to compensate for the consumption or the destruction thereof as the pool is being used.

The present invention considerably simplifies the management of pools, in particular of individual pools, by its various characteristics, as more completely defined and described hereafter, while also globally reducing the servicing cost. Thanks to the thus performed automatic control, the user doesn't anymore need acting to control the disinfectant dosage as a function of the conditions which influence the consumption, and he doesn't risk disorderly, either insufficient or excessive, additions.

The invention however does not require measuring the disinfectant content in the pool water. For this reason and because of a large number of other features, the invention only requires for its implementation a simple, inexpensive and solid built equipment, while however bringing a good operating security for a satisfactory precision. This equipment furthermore is easy to install and can easily be adapted as a complement to water purifying and regenerating equipment already provided in the existing swimming pool installation.

SUMMARY OF THE INVENTION

To reach its objects, the invention essentially consists of controlling the addition of the disinfectant (or of any other purifying or regenerating agent) by an action on the quantity of water which will be sampled and recycled by flowing through the purification circuit during a given time period (or period unit), which action is performed by controlling the members carrying out such circulation as a function of a detection of a measurable quantity having a one to one relationship with the disinfectant content needed in the pool water.

According to one of the features of the invention, said measurable quantity advantageously is the pool water temperature. Its measurement is very easy. It in particular is sufficient to place a temperature sensor on the branch line making up the purification circuit. And it is easy to determine, by experiment and calibration, a one to one relationship between this temperature and the purification and regeneration rate needed to bring the pool water back to the appropriate sanitary conditions. Whether the temperature increase for instance is a cause for an increase of the bacterial proliferation, or whether it in contrast is a consequence thereof, or whether it still is related with an unusual number of visitors, does not in any way matter here. It will in all cases automatically cause the needed disinfectant addition.

It will thus be understood that knowing the value of the disinfectant content itself is not needed within the scope of the invention. In a manner which may be called symmetrical, the invention also allows that a direct control of the injection of a dosed disinfectant quantity is not needed either inasmuch as, according to another feature of the invention, its incorporation is carried out in the purification circuit built as a branch circuit of the pool, in a manner naturally related with the quantity of sampled and recycled water by time period unit.

It should be noted that no proportional or other relationship between the quantity of water thus treated and the disinfectant dose injected into it is necessary. Here again, in practice and at least in the most current conditions, an autoregulation will result from a microbial proliferation exacerbated by a disinfectant insufficiency, with consequences on the sensed temperature, so that an experimental calibration is sufficient to insure a satisfactory operation in most situations.

In its preferred embodiments, the invention exploits the fact that a large number of traditionally used disinfectants for pool water maintenance are introduced by means of equipment in which the circulating water passes. This in particular is the case of the "pebbles" which release chlorine upon contact with the water due to its dissolution power, and of the chlorine generators where a sodium chloride solution is electrolyzed. Chlorine is thus exclusively produced when the water is circulated in the treatment circuit.

Other important features of the invention mainly are related with its application in the field of the private swimming pools. Since those pools are used in an intermittent manner, it is desirable on the one hand that the water treatment circuit does not permanently operate, but it also is desirable on the other hand that it operates each time for a duration sufficient to stir all of the pool water. In other words, this operation should last long enough to treat a water volume substantially matching the volume contained in the pool.

The invention advantageously provides a device for automatically managing the pool water maintenance operations in an installation which, in a manner traditional per se, includes a stirring pump with on-off controlled driving to circulate the water from the pool towards a treating circuit connected in closed loop with the pool and also includes means for injecting a disinfectant into said circuit, with said means preferably being such that the flow rate of the added disinfectant only depends, in normal operation, upon the water flow rate being circulated by the pump.

According to various features which should be considered here either separately or according to any technically operating combinations, such a device according to the invention includes a temperature sensor being mounted on said circuit to be responsive to the temperature of the water sucked from the pool and means which are process bound with said sensor to initiate the operation of the stirring pump at a predetermined constant flow rate for a duration depending upon the temperature sensed by the sensor, with such variable duration advantageously corresponding to an integer number of sequences (or time slots) of a predetermined fixed duration, and with said variable duration being calculated to circulate in said circuit a total water volume substantially equal to the pool water content.

Preferably, the operation is performed according to preset programs which in particular are differentiated by a daily number of stirring sequences of the same duration unit, among which the choice is determined by automatic selection, on the basis of predefined contiguous ranges of temperatures measured, according to the range in which the temperature determined by the sensor is included.

Preferably also, this water sensing is periodically performed in the treating circuit at the beginning of any stirring sequence, with a time relay allowing a validation of the pool water temperature measurement which determines the duration of the stirring to be performed within a given time period, notably the daily duration.

It furthermore is advantageous to devise safety operation programs which can be initiated in any one of three ways; a first way concerns an automatic control by the same electronic circuits that also perform the regulation of the disinfectant addition in normal operating conditions, in such a way that the stirring pump permanently operates if for instance the water sensing reveals a measured value lower than a minimal freeze risk value and/or higher than a maximal value corresponding to a risk of intense pollution; the second way provides for a hand control allowing the user to intentionally start the stirring pump and thus cause the temperature sensing which in its turn will cause the modification of the daily program, when he anticipates an additional pollution risk (leaves falling in the swimming-pool, intense insulation, and so on), the third way provides for an automatic control performed by other control circuits, which for example would be the case if the device of the invention acting as a so-called normal regulation is coupled to a system detecting the external temperature, which initiates the pump operation if such temperature rises above a determined threshold. In all cases, the device of the invention can be equipped to generate an alarm signaling the safety conditions.

According to a further feature advantageously applied to the device of the invention, the stirring pump samples the circulated water in said circuit by sucking partly from the pool bottom and partly from the surface, with both parts being mixed upstream of the temperature sensing, so that the measured temperature which controls the treatment time determination is representative of an average temperature within the pool.

BRIEF DESCRIPTION OF THE DRAWINGS

The present invention now will be more completely described within the frame of preferred features and their advantages by referring to the figures of the appended drawings illustrating them, wherein.

DETAILED DESCRIPTION OF THE INVENTION

Figure 1:
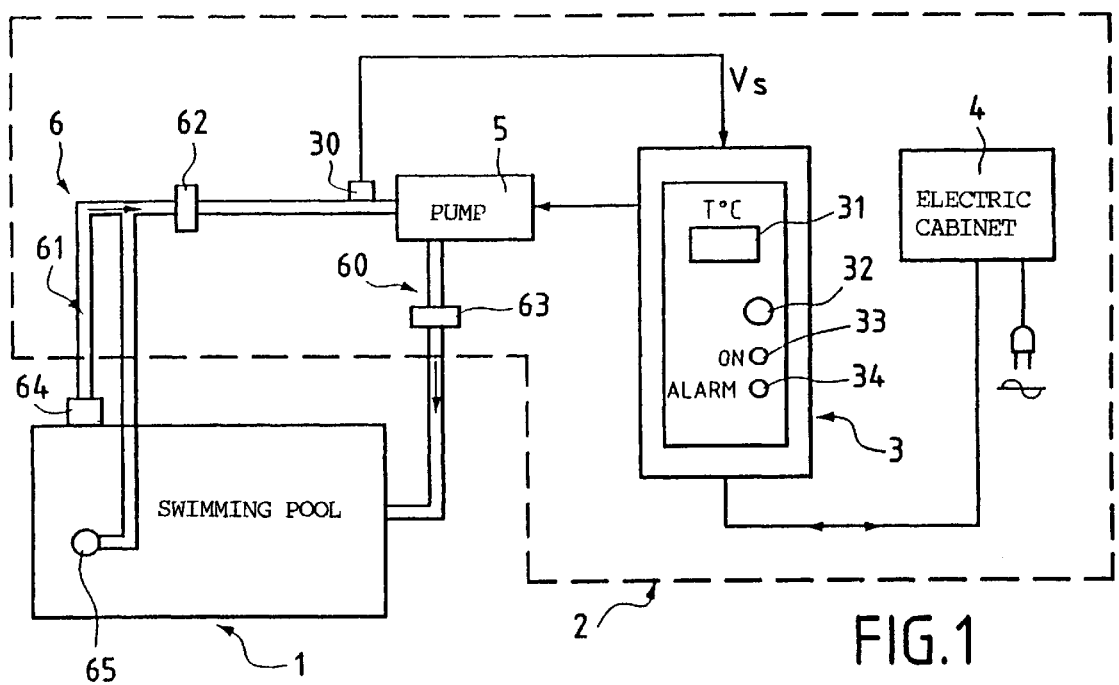
FIG. 1 schematically illustrates an overview showing an exemplary device according to a preferred embodiment of the invention and a swimming-pool maintained by this device.

FIG. 1 is a block diagram schematically illustrating the automatic maintenance management device of the invention and consequently showing the swimming pool, the corresponding water regeneration members and the means for regulating the water maintenance conditions by adding a disinfectant.

This set more precisely can typically be divided into two main subsets: on the one hand, the swimming-pool 1 proper, equipped with a bottom plug 65, a surface sucking mouth incorporating a disinfectant pebble, or "skimmer" 64, and a recycled water mouth for treated water and, on the other hand, technical premises 2, near the swimming-pool, with all mechanical and electronic equipment needed for the pool water maintenance treatment and the regulation thereof.

The water in the treating circuit 6 passes back and forth between both above-mentioned subsets. As shown in the figure, the circuit wherein the water is circulated by a so-called stirring pump 5 includes a water sucking channel 61, which here is duplicated to suck water partly from the pool bottom through the bottom plug 65 and partly from the surface through the "skimmer" mouth 64, and a return channel 60 where the treated water is recycled towards the pool by passing through a filtration member 63. A temperature sensor 30 is mounted on the thus built branch circuit of the pool.

The figure also shows that the sucking channels 61 are associated with a valve 62. The latter provides for a constant ratio for mixing the flow coming from the bottom plug and the flow coming from the surface sucking orifice. Thanks to this function, performed upstream of the temperature sensor, the sensed temperature sent as a measurement signal to the regulation circuit certainly is representative of an average temperature of the water contained in the pool, which remains true to the calibration conditions. Alternatively, an analogous valve system, associated with a local hand control means or with remote motorization and control means also can be used to allow the same equipment embodying the invention to define particular operational rates, which will for instance be differentiated by privileging a surface water sucking, from the pool towards the treating circuit.

The drawings do not represent other valves and pipes designed to, in a traditional manner, allow either isolating the pump from the rest of the circuit, or causing a circulation in a reverse direction with a sewage rejection for filter cleaning periods, or maintaining or replacing mechanical components, or performing emptying as well as new water supplying operations.

The water is circulated in the circuit 60-61 by the pump 5, driven by an electric motor (not shown). This is a constant flow rate pump, but the flow rate obviously depends upon the size of the installation. In the particular case illustrated here, the disinfectant is distributed by a chlorine diffusion pebble 64, which only is operative when the pump 5 circulates water in contact with it. Alternatively, other regeneration system can however be used, notably the electrolysis based systems, which then will be placed downstream, and not upstream, of the pump 5, or more precisely downstream from filter 63, since they require eliminating all solid particles that could be contained in the water coming from the pool.

For purposes of regulation, the device of the invention essentially comprises a control and viewing box 3, housing the electronic circuits that will be described in a more detailed manner hereafter while referring to FIG. 3 and that receive the electric signals Vs, transmitted by the temperature sensor 30 and representing a water temperature measurement periodically performed according to modalities which also will be detailed hereafter. In a manner traditional per se, the technical premises 2, or what is used as such, also include an electric cabinet 4 for the electric power supply of the various components both of the device 3 and of the motor of the pump 5.

Figure 2:
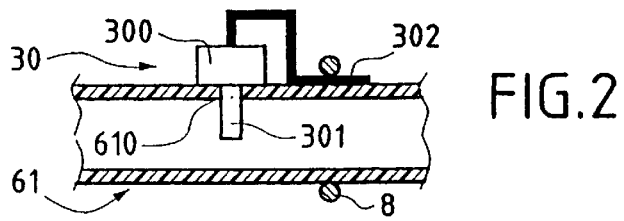
FIG. 2 illustrates the mounting mode of a water temperature sensor, used by the device of FIG. 1.

FIG. 2 illustrates a possible mounting mode for the sensor 30 on the sucking channel of the pump 5. The sensor 30 is downstream from the valve 62. It includes a body 300, made of a case of any proper shape, and the temperature sensitive element 301, which must be immersed in the water circulating inside the duct 61. Supposing that the duct 61 is based on a plastic material, for instance polyvinyl chloride, all that is needed is piercing the duct 61, inserting the sensitive element 301 and adhere the case 300 by means of an appropriate adhesive. The cable for the output signals 302 can be fixed along the duct by means of one or several collars 8.

The control box 3 typically includes, on its front face, a viewing member 31 (for instance a liquid crystal display or plasma display), a visual indicator 33, green colored for instance (marked "ON" for instance) indicating the start up of the pump 5 and an alarm visual indicator 34, red colored as usual (marked "ALARM" for instance). The viewing member 31 exerts a double function of alternately displaying the time and the measured water temperature. Setting or resetting the time and passing over from one to the other display mode is performed by pressing a push button 32. The device can, in a traditional manner, be designed such that the viewing member 31 will automatically switch to the temperature display mode, after a predetermined period of time following a time reset.

The electronic control circuits, that constitute with the temperature sensor the essential feature of the device of the invention, are grouped on a printed circuit board 7, of a type traditional per se and advantageously conforming to the standards for a given country, for instance the CE standards for France. The various components used here will advantageously meet industrial type specifications. They in particular should operate in a temperature range extending from −40° C. up to +50° C.

The electric power supply for the circuits on the printed circuit board 7 is provided by a transformer 77 connected with the mains (for instance by means of a 220 V tap, not shown), which delivers a very low tension, typically 6 V. The tension is rectified and regulated by traditional circuits, designated by the single reference 76. The transformer 77 is of a high insulation type (typically greater than or equal to 4000 V) and is protected by a varistance (with a breakdown voltage of 275 V, for instance) and a fuse, typically rated at 3A. This last value depends upon the nominal power being used. These features are useful to insure that the circuits meet the safety standards. They will naturally depend upon the specific application and the user country.

Figure 3:
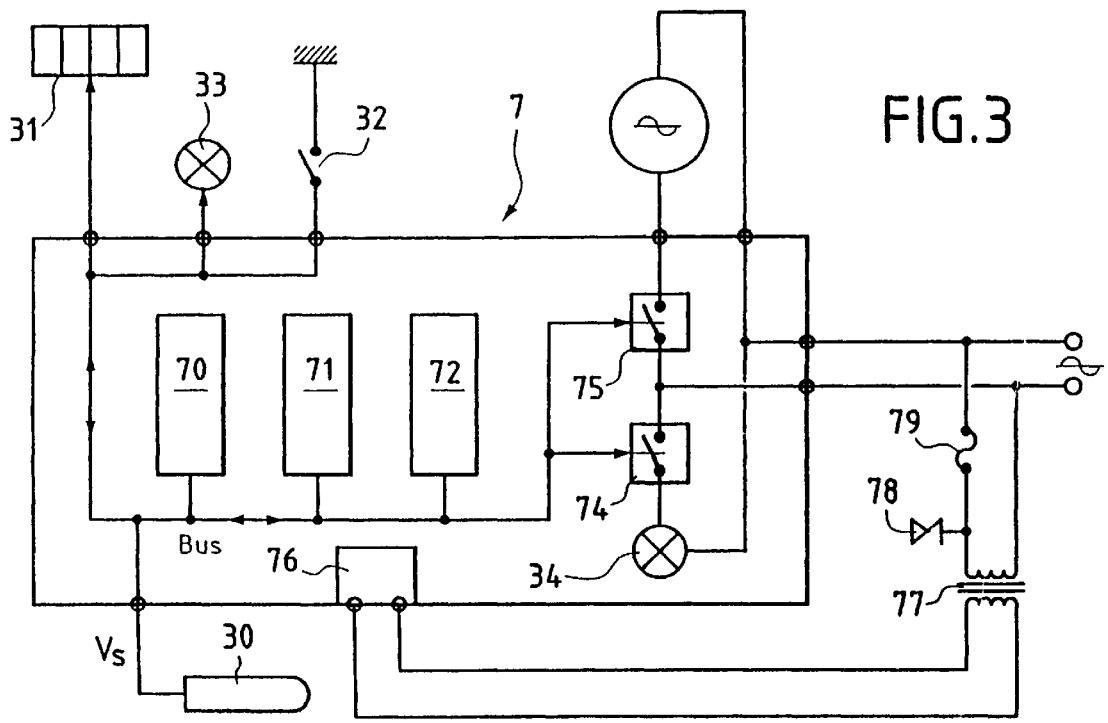
FIG. 3 is a synoptic schematic of the electronic circuit of the device of FIG. 1.

The electronic circuits, both for the control and for the signal treatment proper to the invention consist of three integrated circuits in the example described in FIG. 3: a microcontroller 70, a time base 71 and a so called real time clock 72. In a well-known manner, these electronic components communicate with one another via a bi-directional data transmission bus. The board components, in particular the microcontroller 70, receive signals from the temperature sensor 30 and the push button 32. They elaborate control and signaling signals, transmitted to the visual indicator 33, to the viewing member 31 for displaying the temperature measured by the sensor 30, and to electromagnetic relays 74 and 75 for controlling the pump 5 and controlling the visual alarm indicator 34, respectively.

The output signals are transmitted to the receiving members, either directly or via amplifiers or traditional adaptation, not shown, circuits. Similarly, if the temperature sensor 30 includes no digital to analog conversion circuits and no amplification and/or adaptation circuits, such circuits will be provided on the board 7, since the microcontroller 70 only processes standardized binary digital signals. A specialized port (not shown) including conversion circuits could be provided. Otherwise, a branching could for instance be established through the serial port.

After having reminded the circuit configuration of an exemplary device according to a preferred embodiment, the main features of the method of the invention for maintaining the water of the swimming pool 1 will now be described while referring to a particular implementation mode.

According to a first important feature of the invention, the water temperature in the pool 1 is periodically measured by means of the sensor 30. The output signals $V_s$ are proportional to the amplitude of the measured temperature and they include an information as to the sign of this temperature. After conversion if needed, they are transmitted to the microcontroller 70 for processing and elaboration of control commands for the stirring pump 5. In practice, the measured temperatures are taken into account according to a minimal frequency of predefined hourly ranges, for instance at the beginning of each stirring period or every hour. The measurement is validated after a determined time delay following the stirring start, for instance after 5 minutes, so that it indicates the actual pool water temperature.

According to an important second feature of the invention, the daily duration for the water stirring, and consequently for the filtration and the disinfectant addition, depends upon the various temperatures read and processed by the microcontroller 50. The thus determined total daily stirring duration is then distributed among predefined hourly ranges, depending upon the preset treatment program options.

In a preferred embodiment, a maximal predetermined number of ranges is defined, for instance a maximum number of three daily ranges, with the duration of each range being variable, potentially null, depending upon the selected program. This individual duration also is determined by each program such that the sum of the individual durations reaches the desired global duration for a daily treatment. Also, each duration in a determined hourly range should be long enough to circulate in the processing circuit a total volume of water substantially equivalent to the pool content, and each duration should furthermore be equal to an integer number of time slots, each of which is equal to the duration unit, which could be for instance a real time hour.

To clarify the possibilities, and without this limiting in any way the scope of the invention, the following table shows an example of a series of preset programs, indicating for each of them the daily stirring duration based upon the temperature measured by the sensor, and the distribution of this total duration in a number of time slots (or sequences) each of which lasts one hour, which are distributed in three hourly ranges, respectively, in the morning, the afternoon and the evening of each day. In practice, the program is selected by comparing the measured temperature taken into account with the contiguous predefined temperature ranges.

| Temp. Range °C. | Duration h/d | Distribution a.m slot | aft. number | eve. | Daily program times |
|---|---|---|---|---|---|
| <3 | 24 | Permanent operation | | | (→ ALARM) |
| 3.1 to 6 | 2 | 2 | 0 | 0 | 8–10 am |
| 6.1 to 9 | 3 | 3 | 0 | 0 | 8–11 am |
| 9.1 to 12 | 4 | 4 | 0 | 0 | 8–12 noon |
| 12.1 to 15 | 5 | 3 | 2 | 0 | 8–11 am, 2–4 pm |
| 15.1 to 18 | 6 | 3 | 3 | 0 | 8–11 am, 2–5 pm |
| 18.1 to 21 | 7 | 4 | 3 | 0 | 8–12 noon, 2–5 pm |
| 21.1 to 23 | 8 | 4 | 4 | 0 | 8–12 noon, 2–6 pm |
| 23.1 to 26 | 10 | 2 | 4 | 4 | 3–5 am, 8 am–12 noon, 2–6 pm |
| 26.1 to 28 | 12 | 4 | 4 | 4 | 3–7 am, 8 am–12 noon, 2–8 pm |
| 28.1 to 30 | 14 | 4 | 4 | 6 | 3–7 am, 8 am–12 noon, 2–8 pm |
| 30.1 to 31.9 | 16 | 4 | 4 | 8 | 3–7 am, 8 am–12 noon, 2–10 pm |
| ≧32 | | Permanent operation | | | (→ ALARM) |

An examination of the table shows that the extreme conditions, either climatic or related to the use of the pool 1, which correspond to a water temperature T, either lower than a first threshold (T<3° C.) or higher than a second threshold (T≧32) cause a permanent water stirring and a maximal daily filtration period of 24 hr. A detection of these extreme conditions also causes the firing of an alarm. The microcontroller 70 will generate an alarm signal transmitted to an electromagnetic relay 74, which drives the visual indicator 34 of the alarm. This visual indicator 34 is connected with the mains via the contacts of the relay 74. The visual indicator 34 will stay permanently lit. If necessary, other types of visual and/or sound alarms also can be provided.

Simultaneously with the alarm signal, the microcontroller 70 generates a signal transmitted to a second electromagnetic relay 75, which connects the electric motor of the pump 5 with the mains. As indicated above, the alarm signal is permanent until the above mentioned extreme conditions have disappeared or until an authorized operator has stopped the device by any appropriate means: switch and so on (not shown). In all other cases, which will be considered as pertinent for a normal operation, the visual indicator 34 is not driven. The total filtration duration is determined by a prerecorded program in the microcontroller 70 and is distributed among the predefined distinct hourly ranges. The daily duration for a normal treatment is included between the minimal and the maximal values (2 hours and 16 hours, respectively, in the described example).

The microcontroller 70 cooperates with two other circuits 71, 72, as already indicated. According to the measured temperature, the microcontroller 70 generates binary order words, which are transmitted to the circuit 71. The latter is a programmable time base, which generates a variable duration signal according to the binary configuration of the order words provided at its input. The specific configuration forces the time base to generate a permanent output signal. The output signals are transmitted to the relay 75, either directly or via the amplification and/or forming circuits (not shown). If the daily cycle is divided into distinct ranges, as is the case in the preferred embodiment of the invention (three ranges in the described example), the microcontroller 70 transmits an order word to the time base 71 at the start of each range.

It should be clearly understood that the operation duration in a determined hourly range can be null as shown on the above table. Outside the extreme, low and high, conditions, the microcontroller 70 will, each time the pump 5 operates, generated a signal to be transmitted to the visual indicator 33, either directly or via an amplifier and/or a forming circuit (not shown).

The third circuit, 72, consists of a real time clock. This circuit 72 namely is autonomously power supplied, by an accumulator or a battery, so as to determine the time elapsing during a mains failure thus insuring a time keeping function. It is desirable that the time drift of this circuit is limited, typically a maximal 2 minutes drift per month. Namely, a mains failure happening for some reason or another during the winter season, and in particular for the private pools, may last due to the absence of the owner (holiday house, and so on). This feature also allows in-plant setting of the hour in a new device. When the device is installed on site, the customer or the installator does need to take care of the hour setting.

In each case, when the mains supply is reestablished, the device is automatically reset into its normal operation. As soon as the microcontroller 70 processes a temperature measured at the beginning of an operating phase of the stirring pump, the test performed determines the choice of the new stirring program.

As long as the successively measured temperatures stay within the same range, for instance between 18.1 and 21° C., in the examples shown on the tables, the microcontroller 70 keeps the same water stirring and filtration program for the water in the pool 1. The pump 5 is supplied according to the same predefined rates: a daily base of 7 hours, distributed among two periods respectively lasting 4 and 3 hours in the example selected. If in contrast the measured temperature for instance rises to 24° C., a new program is selected: the total daily stirring period is 10 hours, distributed among three periods, of 2, 4 and 4 hours, respectively.

As previously indicated, the various operating states are visualized by means of the visual indicators 33 (normal operation of the pump 5) and 34 (alarm) as well as the visualization of member 31 (measured temperature or time display). It should be noted that, whereas the sensor 3 should be able to sense the temperature variations typically on the order of one tenth of a degree, or even less, it is not necessary for the visualization member 31 to display the temperature with such a precision. A visualization member including two digital indicators with seven segments each is advantageously used, which gives a sufficient indication (±1° C.) of the water temperature, although the latter is measured with a higher precision.

In addition to the automatic operation controlled by the temperature sensing, an alternative implementation of the invention provides for a possibility of overriding this regulation in a manual mode. The push button 32 is of a multifunction type and can in particular exert that function. All that is needed is to provide for a discriminatory pressing mode (manual-pressing duration on the button longer than a predetermined threshold, for instance), to pass into the manual mode and force the pump to operate on a continuous basis.

The device programming can be performed once for all, in-plant. As is well known, a microcontroller usually is associated with ROM circuits and RAM circuits. A ROM memory can be of a simple ROM type, or can be programmable like a PROM, an EPROM, and so on. These memories can take several forms depending upon their programming possibilities: data recording by electric signals, erasing by ultraviolet light and re-recording, and so on. Some memory types can be reprogrammed on site, by means of special portable devices. In all cases, those memories store the software and the instructions necessary for the microcontroller operations and for the performance of specific programs.

The present embodiment of the invention provides for storing information necessary for the elaborating the operating programs of the pump 5, as shown in table 5. The temperatures measured by the sensor 30 are compared to the measurements prerecorded in memory. The usual process consists of addressing memory positions with address words. In the present application of the invention, those address words are derived from the amplitude (and the sign) of the measured temperatures. The data stored in the addressed memory positions are used to define the global stirring durations and their possible distribution among individual ranges.

According to another alternative embodiment, the programming could be performed by the user, either on a entirely free basis or by selecting predefined ranges. The programming data could then be input, either by means of keys or a keyboard arranged for instance on the control box 3, or else by a remote control of the infrared type for instance, acting on an electro-optic sensor arranged on the front face of the case or within this case, on the board 7.

In the latter case, it naturally is necessary that the cover of the case 3 can be opened. For all these alternatives, it is necessary to include a random access memory, of the RAM type, which can be written and read as needed, or memory registers. These storing members should have their autonomous power supply, by an accumulator or a battery, so that the recorded program can be maintained during a mains failure.

The previous description clearly explains how the invention allows reaching the objects it is aiming at. It in particular allows savings of both materials and electric power by minimizing and optimizing the filtration period. It also allows a large operating flexibility without requiring any complex measurement. Simple temperature measurements allow both determining the filtration times and optimally distributing them on daily basis. The components used are available off the shelf and imply no high costs.

Furthermore, the components entirely specific to the invention are limited in number. The mounting of the device of the invention in an existing solution does not raise any particular problem and is easy.

It however should be clearly understood that the invention is not limited to the only embodiments explicitly described, in particular in relation with the FIGS. 1 to 3.

In particular, the usable components and the digital values, which have been exposed, are in a narrow correspondence with the specific application considered herein. Similarly, the method is not limited to a daily programming, or to a precise number of distinct ranges. The temperature measurements can be performed at times that are not necessarily coincident with integer hours and they in fact can be performed on a continuous basis.

Instead of using a microcontroller, the invention can use a standard microprocessor, or a microcomputer also used for other tasks, in particular in the case or a large installation (town swimming pool, and so on) and, in a general manner, any digital data processing equipment with a recorded program.

The alarm circuits can be of various natures, as already mentioned: visual alarm, sound alarm, and so on. The alarm actuating signals can have a direct effect (locally), but can also be downloaded, by means of a remote alarm system, via a traditional telephone line for instance. The system can include pool water heating members, actuated in response to an alarm due to a temperature measurement below the minimal allowable temperature, i.e. 3° C. in the described example. The heating control can be local or downloaded, for instance via the previously mentioned telephone line.

It also should be clear that the invention could not be restricted to the only application of private swimming pools, i.e. with modest dimensions and a relatively restricted use. It also finds applications for other types of swimming pools or similar installations: pools in hydropathic centers, and so on.

What is claimed is:

1. A method for servicing the water of a swimming pool (1) by adding a disinfectant, said disinfectant addition being carried out by circulating the water in a closed circuit built as a branch circuit of the pool, wherein the water is circulated at a constant flow rate while sampling and recycling to the pool, said circulation being carried out by means of a stirring pump (5) with a constant flow rate, characterized in that
said disinfectant addition is automatically controlled based on a sensing of the temperature of the water circulating in said branch circuit, and in that
the operation of said pump (5) is performed according to preset programs, said preset programs differ from one another by a daily number of stirring sequences of units of a same duration, among which the choice is automatically determined, on the basis of predefined contiguous ranges of temperatures measured, according to the range in which the temperature determined by said temperature sensing is included.

2. A method according to claim 1, characterized in that the temperature sensing is periodically carried out in said branch circuit at the beginning of any stirring sequence with a delay time allowing a validation of a pool water temperature measurement which determines a duration of the stirring to be performed within a given time period.

3. A method according to claim 1, characterized in that, when the temperature sensing reveals a measured value lower than a minimal freeze risk value or higher than a maximal value, the pump is continuously operated and a warning is generated.

4. A method according to claim 1, characterized in that said disinfectant addition is carried out from a pebble support interposed on said branch circuit, from which said disinfectant is progressively released by contact with the circulating water.

5. A method according to claim 1, characterized in that said disinfectant addition is carried out by electrolysis of the water circulated in said branch circuit, wherein said water includes a chloride so that the electrolysis produces molecular chlorine.

6. A method according to claim 1, characterized in that said stirring pump samples the circulated water in said branch circuit by sucking partly from a bottom of the pool and partly from atop surface of the pool, with both parts being mixed upstream of the temperature sensing so that the measured temperature which controls the stirring duration is representative of an average temperature within the pool.

7. A device for disinfecting swimming pool water, characterized in that the device includes:
   a. a means for adding a disinfectant;
   b. at least one stirring pump (5) adapted to circulate said water by sucking water from a pool and recycling it thereto to filter said water and to cause said means for adding a disinfectant to treat said water in a closed treatment circuit (60), said closed treatment circuit being a branch circuit of the pool;
   c. a sensor (30) mounted in said branch circuit for detecting the temperature of the circulated water and for generating an electric output signal ($V_s$) representative of the measurement of said temperature;
   d. a digital data processor (70) adapted to carry out comparisons between the measured temperature and predefined contiguous temperature ranges, so as to generate control signals which select an operating duration of said stirring pump (5) to be spread over time ranges according to preset programs; and
   e. actuating means (75) controlled by said control signals for actuating the stirring pump (5).

8. A device according to claim 7, characterized in that said digital data processor includes the following circuits implanted on a printed circuit (7), said circuits include electric power supply circuits (76), a microprocessor (70) receiving signals representing the temperature measured by said sensor (30) and having a storage means for a treatment program, an electronic time base (71) for elaborating signals corresponding to operating durations of the stirring pump (5), and clock circuits (72) permanently supplied with electric power and adapted to keep a trace of a time elapsed in case of a failure of said electric power supply circuit.

9. A device according to claim 7, characterized in that said actuating means for the pump (5) comprises an electromagnetic relay (75) for an electric power supply of the pump (5).

10. A device according to claim 7, characterized in that it comprises a control panel (3) with a display member (31) for alternately displaying said measured temperature or time, a visual indicator (33) for indicating the operation of said stirring pump, a warning visual indicator (34) actuated when said measured temperature is lower than a minimum value or higher than a maximal value, and a multifunction push button (32) for updating said digital data processor (70) and forcing the operation of the stirring pump (5) in a manual mode.

11. A device according to claim 7, characterized in that it includes means for generating a visual, sound, local or telemetered alarm (75, 34).

* * * * *